May 29, 1928.  1,671,355
A. J. DEXTER
MOLD OPENING MACHINE
Filed July 6, 1925  2 Sheets—Sheet 1
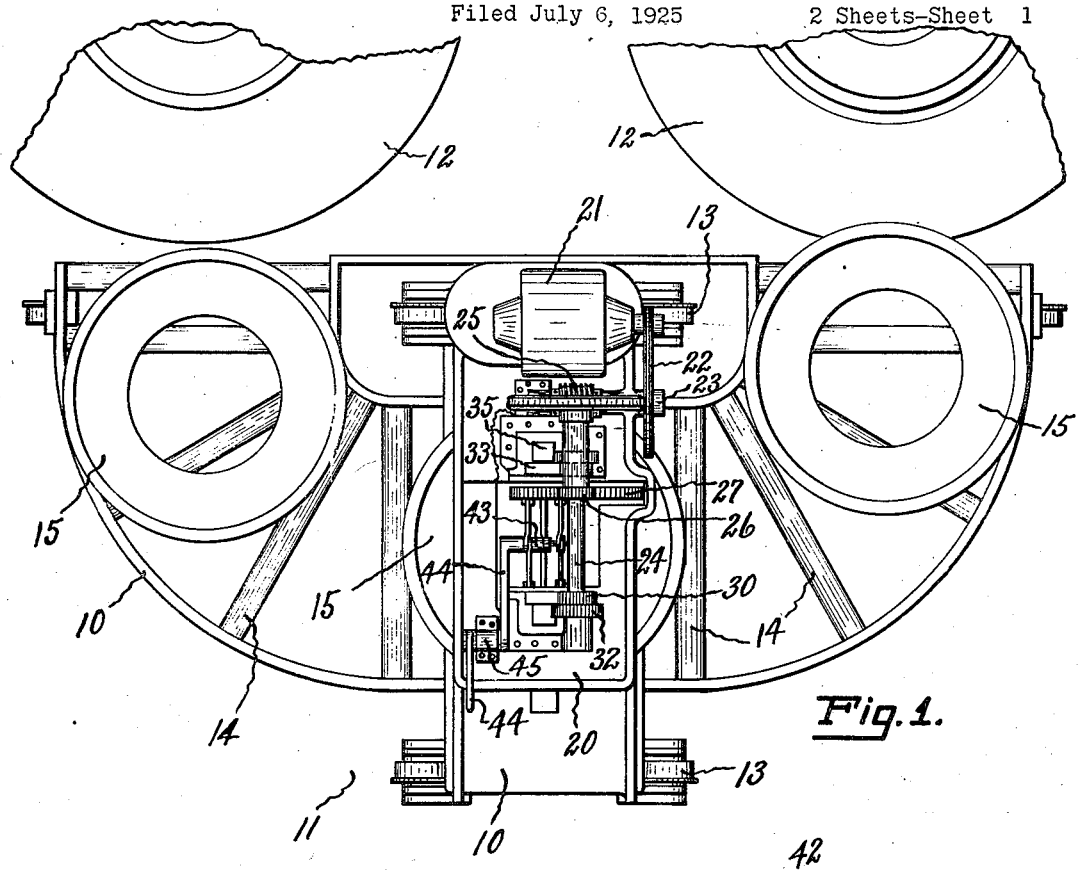
Fig.1.
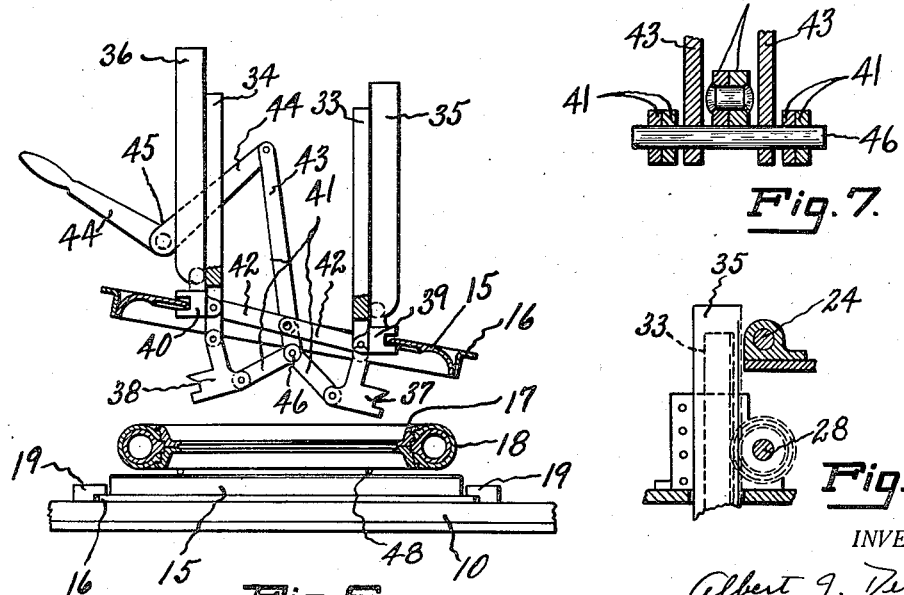
Fig.6.
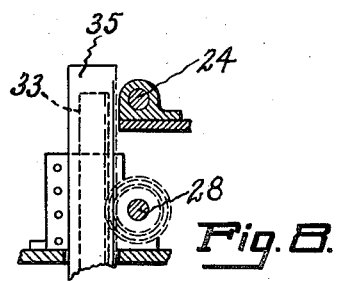
Fig.7.
Fig.8.
INVENTOR.
Albert J. Dexter
BY
Edward C. Taylor
ATTORNEY.

May 29, 1928.
A. J. DEXTER
1,671,355
MOLD OPENING MACHINE
Filed July 6, 1925
2 Sheets-Sheet 2
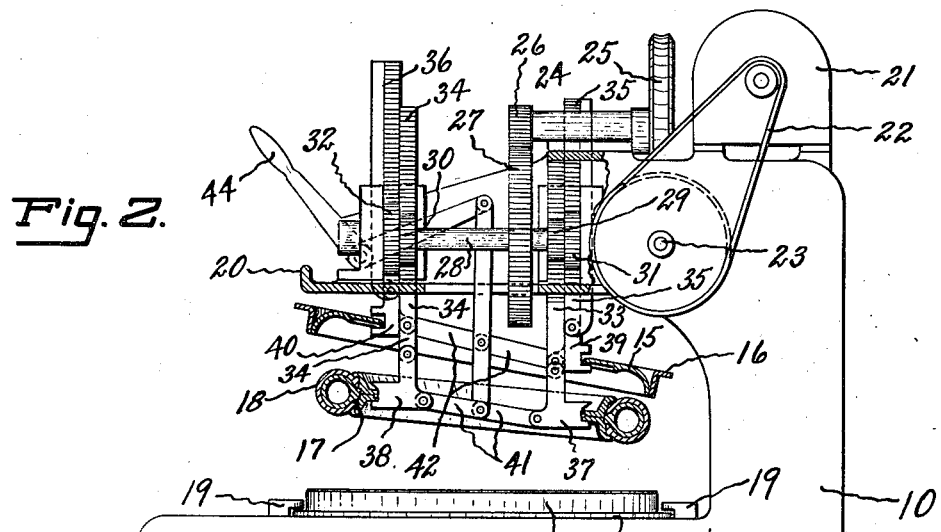
Fig. 2.
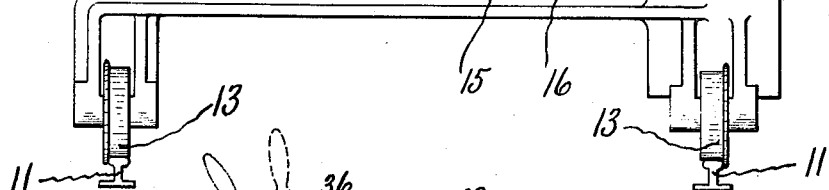
Fig. 3.
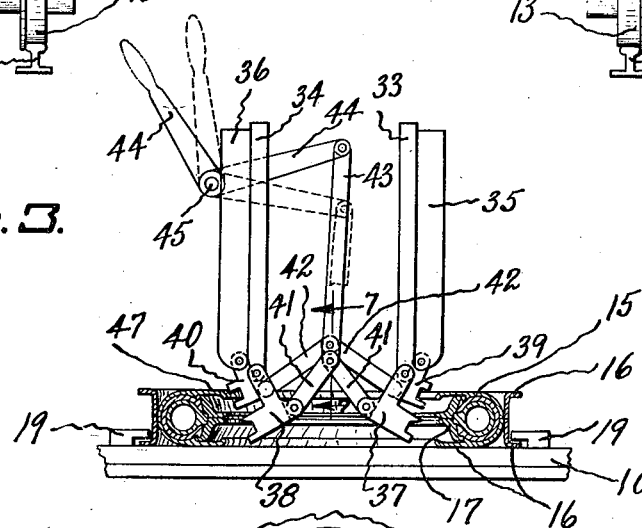
Fig. 5.
Fig. 4.
INVENTOR.
Albert J. Dexter
BY
Edward C. Naylor
ATTORNEY Patented May 29, 1928.

1,671,355

UNITED STATES PATENT OFFICE.

ALBERT J. DEXTER, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

MOLD-OPENING MACHINE.

Application filed July 6, 1925. Serial No. 41,492.

This invention relates to machines for opening the molds in which tire casings are vulcanized, and for stripping the tires therefrom. It has for its object the production of such a machine which will be compact and easy in operation, and which will separate the mold halves in a way most favorable to easy stripping of the tire. Other objects will appear from the description and claims which follow.

Referring to the drawings,

Fig. 1 is a plan view of the device, shown in association with a pair of vulcanizing heaters;

Fig. 2 is a side elevation of the device showing the mold parts in separated position;

Fig. 3 is a partial view similar to Fig. 2 but showing the parts in position to start the opening of a mold;

Fig. 4 is a partial plan of parts shown in Figs. 2 and 3;

Fig. 5 is a detail section on line 5—5 of Fig. 4;

Fig. 6 is a view similar to Figs. 2 and 3 but showing the parts in position after the completion of the operations of opening the mold, stripping the tire from it, and redepositing the tire on the lower mold half for removal;

Fig. 7 is a section on line 7—7 of Fig. 3; and

Fig. 8 is a detail of the operating gearing.

The apparatus in its preferred form is mounted on a carriage 10 movable on rails 11 past a row of vulcanizing heaters or presses 12 by means of wheels 13. The carriage has a platform formed preferably of rollers 14 so that a mold may be moved over it with a minimum of friction. The molds, shown in this instance as two part sheet steel molds 15 although they may be of other types, are provided with lugs or complete flanges 16, and are equipped with the usual bead rings 17 which grip and mold the inner circumferential edges of the tire 18. The lugs or flanges 16 are adapted to pass under stationary overhanging abutments 19 which hold the lower half of the mold against vertical motion during the opening operation.

The carriage 10 has an overhanging portion 20 upon which is carried all the operating mechanism for opening the molds. Power is derived from a motor 21, coupled as by a chain 22 with a counter-shaft 23 which drives a second counter-shaft 24 through worm gearing 25. Upon the second counter-shaft is a pinion 26 meshing with a gear 27 upon a main power shaft 28. The latter shaft has fixed upon it pinions 29, 30, 31, and 32, preferably increasing in diameter in the order given, although pinions 30 and 31 may be of the same size. Each of these gears meshes with an individual rack, these being mounted in suitable guideways for vertical movement and being numbered in the drawings 33, 34, 35, and 36, respectively.

At the bottom of each rack is pivoted an L-shaped member having its outside edge notched to receive a portion of the mold. The several members are numbered in the drawings as 37, 38, 39, and 40 respectively. Members 37 and 38 are pivotally connected by links 41 which are pivoted together so as to form a toggle, and members 39 and 40 are similarly connected by links 42. Straddling links 42, as shown by the sections of Figs. 4 and 7, is a bifurcated link 43 pivoted at its upper end to a manually operable bell crank 44 pivoted at 45 to the carriage.

The parts are shown in Fig. 3 in readiness for the initiation of the mold opening operation. It will be noted that handle 44 has been depressed to raise the center of the toggles and hence draw the L-shaped members away from the inner circumference of the mold. Link 43 is connected directly only to the pivot 46 of links 41, but as clearly shown in Fig. 7 this pivot extends between the links so as to engage the under side of links 42. Accordingly when the bell crank 44 is turned, links 41 will first be raised and then, if the movement is continued long enough, links 42. With the parts in the position of Fig. 3 the handle of the bell crank is turned into the dotted line position, causing pivot 46 to be depressed and forcing the L-shaped gripping members 37, 38 into engagement with the inwardly projecting flange of bead rings 17. The upper toggle, formed by links 42, may be pushed down by hand so as to cause members 39, 40 to engage inwardly projecting lugs or flanges 47 on the upper mold half. Outwardly projecting flanges 16 on the lower mold half are, as will be remembered, gripped under the overhanging abutments 19.

The motor 21 may now be started in a direction to cause all the racks 33, 34, 35, and 36 to be elevated. Since, however, the pinions to which these racks are geared are of different diameters the rate of elevation is different in the several cases. This is of advantage in causing the upper mold half to be separated from the tire, and the latter from the lower half, by a tilting motion rather than by a straight pull. The power necessary to separate the several parts is much less when a tilting force is used than when a straight pull is given, and the strain on the tire is greatly lessened. Due to the sizes of the pinions the upper mold half will be elevated more than the tire, and one side of each elevated more than the other side. The condition of the mechanism at maximum elevation is shown in Fig. 2.

By swinging the handle 44 partway down the lower toggle can now be broken without effecting the upper one, releasing the tire, which may be received temporarily upon rods 48 placed across the lower half of the mold. The cured tire may now be removed, a fresh tire substituted, and the motor started in a reverse direction to lower the top half of the mold upon it. The upper mold half is released from the mechanism by a further downward motion of handle 44, which causes pivot 46 to engage the links 42 as in Fig. 7 and break the upper toggle also. This condition is that illustrated in Fig. 3 except that the mold will not be completely closed, the greater bulk of an unvulcanized tire keeping it slightly open. It may be noted that, while the handle 44 has been referred to above as having certain fixed positions, it in the operation of the machine partakes of a rocking motion during the rise and fall of the links 41 with which it is connected.

The motor control has not been described as any standard form may be used. It preferably, however, is arranged so that by a simple control such as a push button the motor will be started, coming automatically to a stop when the racks reach the limit of their travel in either direction. Such limit and reversing switches are standard equipment and form no part of my invention.

Having thus described my invention, I claim:

1. A mold opening mechanism comprising gripping devices for the opposed mold sections, and means for separating said devices at rates unequal at opposite sides of the mold, whereby the opposed mold sections are separated from each other by a tilting motion.

2. A mold opening mechanism comprising a holding device for one mold half, means for gripping the other mold half at a plurality of points, and means for separating the holding device and gripping means at all points simultaneously but at a faster rate at some points than at others.

3. A mold opening mechanism comprising a driven shaft, a plurality of pinions thereon of different diameters, a plurality of racks meshing with the several pinions, means secured to certain of the racks for engagement with one half of a tire mold, and means secured to certain other of the racks for engagement with a mold part movable with the tire, the pinions engaging the latter racks being of smaller diameter than those engaging the former.

4. A mold opening mechanism comprising means for separating the two halves of a mold, means separating a tire from the mold halves but movable at a lesser rate of speed, and means for releasing the tire from said mechanism without releasing the mold halves.

5. In combination, a series of vulcanizing heaters, a trackway arranged alongside of the heaters, a carriage movable on the trackway, said carriage having a track adapted to carry molds successively from one heater to another, and mold stripping devices mounted on the carriage and adapted to operate on molds in transit from one heater to another.

ALBERT J. DEXTER.